Sept. 1, 1931.   J. W. KAUTZMAN ET AL   1,821,344
FEEDING DEVICE FOR MEAT CHOPPERS AND THE LIKE
Filed May 29, 1929   2 Sheets-Sheet 1
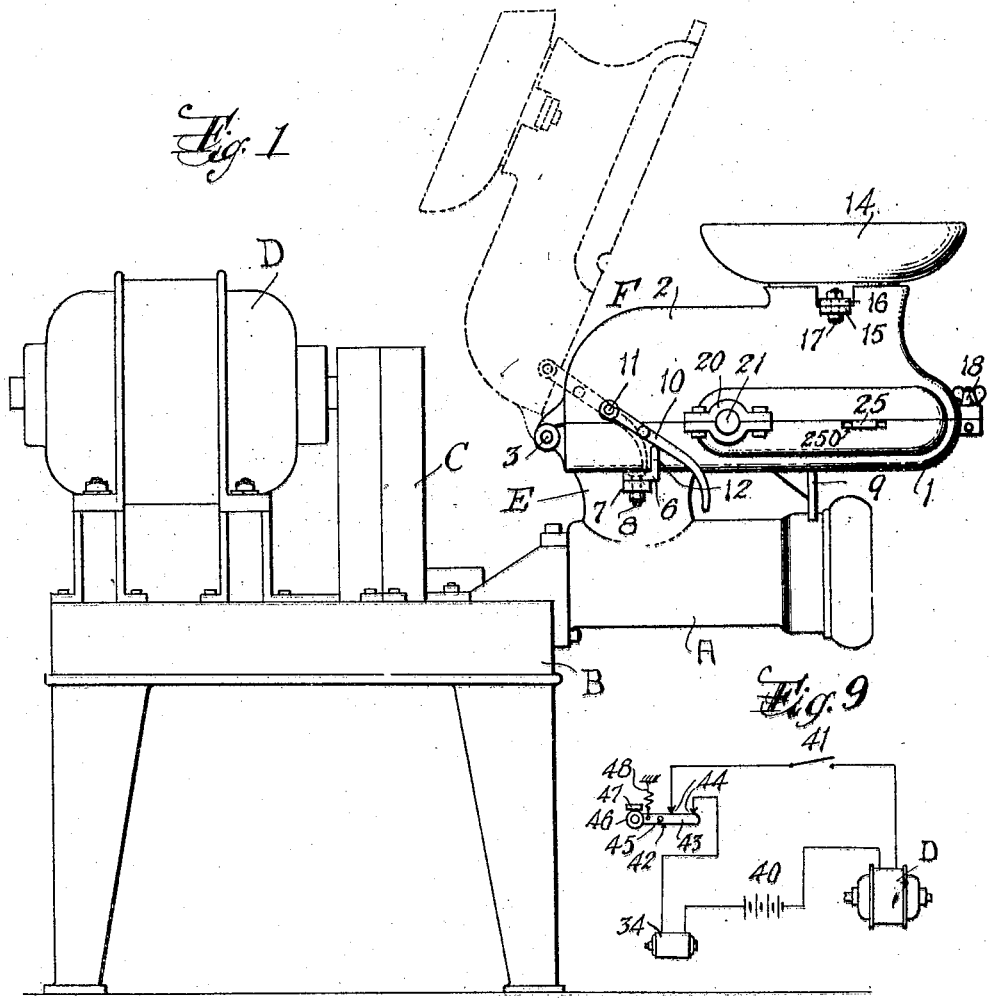
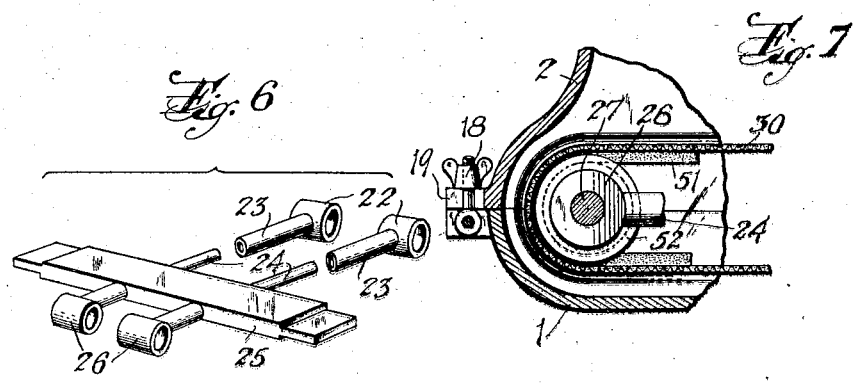

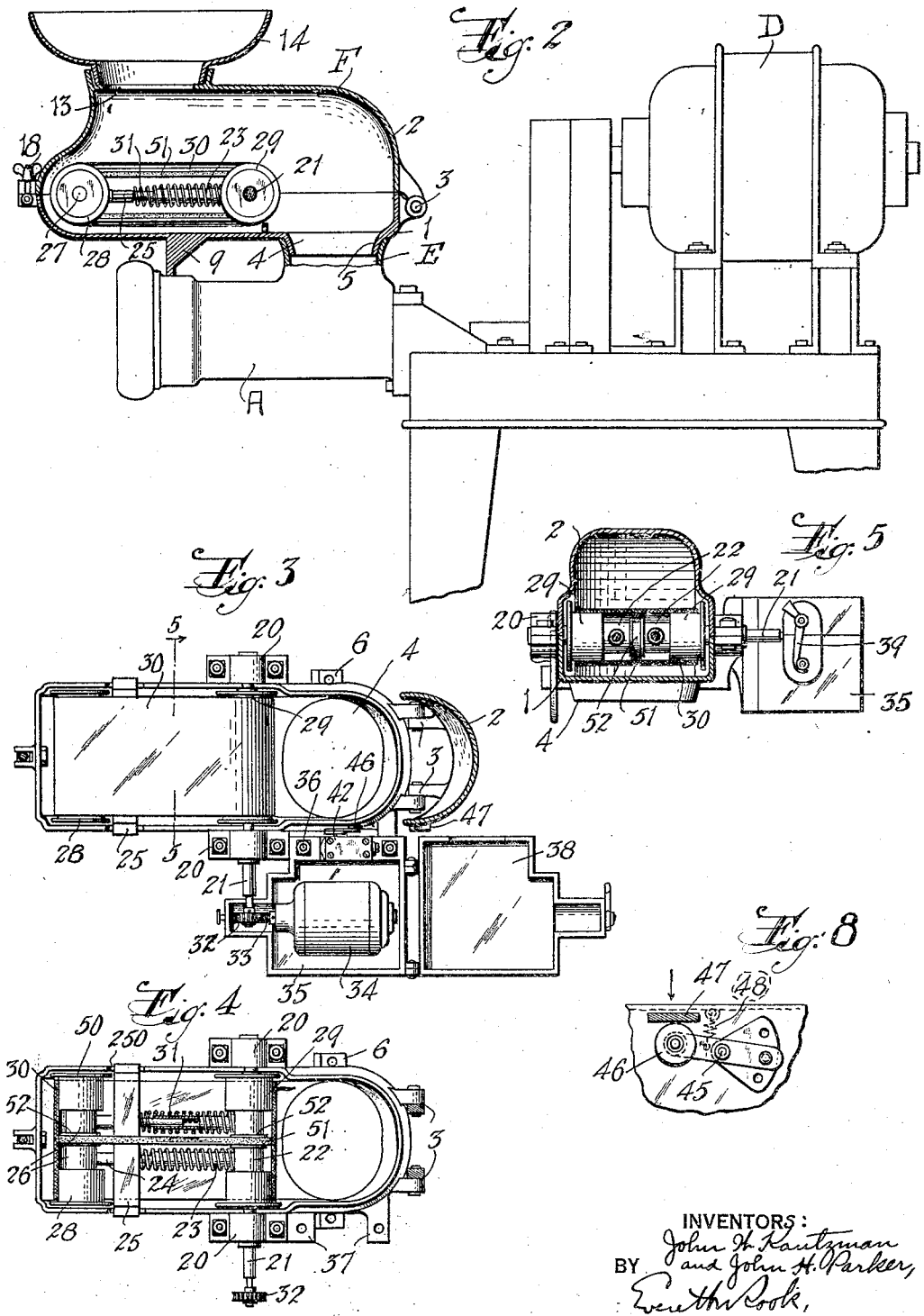

Patented Sept. 1, 1931

1,821,344

UNITED STATES PATENT OFFICE

JOHN W. KAUTZMAN, OF EAST ORANGE, AND JOHN H. PARKER, OF NEWARK, NEW JERSEY, ASSIGNORS TO JOHN W. KAUTZMAN, TRADING AS SANDER MFG. CO.

FEEDING DEVICE FOR MEAT CHOPPERS AND THE LIKE

Application filed May 29, 1929. Serial No. 366,817.

This invention relates in general to a device for feeding pieces of material, such as meat, to a machine for operating upon the pieces, for example, a meat chopper.

One object of the invention is to provide a feeding apparatus of the character described for conveying the pieces of material from a hopper or supply opening to the inlet of the machine, such as a meat chopper, so that it is impossible for the operator to insert his hands into the machine in such a manner as to sustain injury. In meat choppers of known construction, the large pieces of meat sometimes fail to enter the chopping mechanism and the operator attempts to push the meat into the chopper with his hands. In this way the operator's fingers sometimes slip into the chopping mechanism and become seriously injured.

Another object of our invention is to provide feeding apparatus of the general character described comprising a casing and an endless conveyor, the casing having an inlet or charging hopper and an outlet or discharging opening disposed in offset relation and with respect to the conveyor so that the pieces of material are carried by the conveyor from the hopper to the outlet opening and deposited by gravity into the chopping machine.

Further objects are to provide such feeding apparatus in which the conveyor is hingedly mounted in the casing so as to be easily accessible for adjustment and cleaning; to provide in such apparatus means for automatically shutting off the power from the conveyor and the machine being fed when the feeding apparatus is being adjusted; to provide a feeding apparatus with a cover which may be removed for obtaining access to the conveyor, and an electric switch mechanism which is normally held closed when the cover is closed and is automatically opened when the cover is raised so as to shut off the electricity from the motors driving both the machine and the feeding apparatus, and to obtain other advantages and results as will be more fully brought out by the following description.

Referring to the accompanying drawings in which corresponding and like parts are designated by the same reference characters throughout the several views, Figure 1 is a side elevation of a meat chopper having a feeding apparatus embodying our invention applied thereto.

Figure 2 is a vertical longitudinal sectional view through the casing of the feeding apparatus and showing the conveyor mechanism in end elevation.

Figure 3 is a top plan view of the feeding apparatus with the covers raised.

Figure 4 is a similar view with portions of the conveyor belt broken away and with the driving motor mechanism removed.

Figure 5 is a transverse vertical sectional view taken on the line 5—5 of Figure 3.

Figure 6 is a detailed perspective view of parts of the conveyor frame.

Figure 7 is an enlarged fragmentary vertical sectional view through one end of the feeding apparatus.

Figure 8 is an enlarged side elevation of an electric switch operating mechanism; and Figure 9 is a wiring diagram showing the connection of the switch and motors in the circuit.

Specifically describing the illustrated embodiment of the invention, the reference character A designates a meat chopper of known construction mounted upon a frame B and driven by suitable gearing C from an electric motor D. At its top and adjacent one end, the chopper has an inlet opening E to receive material to be chopped.

The chopper and its driving mechanism are old and well known and no claim to novelty is made thereon. In accordance with the invention the material to be chopped for example, pieces of meat, are deposited into the opening E through a feeding apparatus F. This apparatus includes a casing formed of a body part 1 and a cover 2 hingedly connected at one end as at 3 to the body part so as to swing upwardly away from the body part as shown by dot and dash lines in Figure 1. The body part 1 is provided with an outlet opening 4 surrounded by a flange 5 which fits within the inlet opening E of the chopper, and the body portion has lateral lugs 6 at opposite sides which are secured to lugs 7 on the chopper by bolts 8. The underside of the body part has a leg or prop 9 which cooperates with the lugs 6 and 7 for mounting the body part on the chopper. For holding the cover in its open position, we may utilize a prop 10 pivotally mounted at one end as at 11 and arranged to engage behind a flange 12 on one of the lugs 6 when the cover is raised. The end of the cover opposite the outlet opening 4 is formed with an inlet or charging opening 13 above which is mounted a hopper 14 secured to the cover by lugs 15 and 16 on the chopper and cover respectively which are connected by bolts 17. For locking the cover in closed position a swing-bolt 18 is pivotally mounted on the body part and cooperates with spaced lugs 19 on the cover in the usual manner.

Mounted in bearings 20 on the body part is a transverse shaft 21 upon which is pivotally mounted a conveyor frame. This frame comprises two sleeves 22 applied to the shaft and having arranged at right angles thereto, tubular projections 23 in which are reciprocable rods 24 projecting from a bar 25 arranged substantially parallel with the shaft 21 and resting in notches 250 in the edges of the body part so as to support the frame. At the side of the bar 25 opposite the rods 24 are sleeves 26 in which is journaled a shaft 27. A pair of rollers 28 is mounted on the shaft 24 and a similar pair of rollers 29 is mounted on the shaft 21, between the ends of the shafts and the respective sleeves 22 and 26. Upon the rollers 28 and 29 is mounted a conveyor belt 30. This belt is maintained taut by compression springs 31 interposed between the bar 25 and the sleeves 22 as shown in Figure 4, relative movement of the shafts 21 and 27 being permitted by the telescoping rods 24 and projections 23 and the notches 250 in the body part.

The conveyor is arranged with respect to the charging opening 13 and the outlet opening 4 so that pieces of meat dropped into the opening 13 are deposited upon a conveyor and carried thereby and dropped by gravity therefrom through the outlet opening 4 into the inlet opening E of the chopper. The openings 13 and 4 are so relatively arranged that it is physically impossible for an operator to insert his hands into the chopper A.

For driving the conveyor, we may utilize a worm gear 32 on the shaft 21 which meshes with a worm 33 on the shaft of an electric motor 34 which is shown as mounted in a box 35 secured by bolts 36 upon lugs 37 projecting from the body part 1 of the casing F. The box 35 is provided with a hinged cover 38 which is held closed by a latch 39.

Preferably the motor 34 and the motor D are connected in an electric circuit with a switch of suitable construction which is held in closed position by the cover 2 and is automatically opened when the cover is raised so as to throw out of operation both of said motors.

Figure 9 is a wiring diagram which shows the motors connected in circuit with a source of electricity 40, a main control switch 41, and the automatic cover operated switch 42. The details of construction of this switch are immaterial but it may include a blade 43 cooperating with switch contacts 44 and actuated by a lever pivoted intermediate its ends at 45 and carrying at its free end a roller 46 which is arranged in the path of a lug 47 on the outside of the cover 2 (see Figures 3 and 8). The switch is automatically closed by engagement of the lug 47 with the roller 46 as the cover 2 is closed, the lug forcing the roller downwardly so as to oscillate the switch lever. The switch may be opened by a tension spring 48.

It will be observed that when the cover 2 is in closed position, the switch 43, 44 is closed, and that if the main control switch 41 is also closed both motors D and 34 will be operated. The conveyor belt 30 is thus continuously driven so as to convey pieces of material from the charging opening 13 of the feeding apparatus to the chopper.

When it is desired to clean the feeding apparatus, the cover 2 is raised by which access to the interior walls of the casing is obtained, and the conveyor frame may be swung upwardly about the shaft 21 for cleaning both sides of the belt and for obtaining access to all parts of the conveyor. Immediately upon opening of the cover 2, the switch 43, 44 is opened so that both motors D and A are cut out of operation and all moving parts of the apparatus are stopped. Contact of the operator with moving parts is therefore impossible.

To prevent lateral movement of the conveyor belt 30 on the rollers 28 and 29 the rollers may be provided with end flanges 50. In addition to this, we may mount a belt 51 of rubber or other friction producing material on rollers 52 on the shafts 27 and 21 with the belt 51 in frictional contact with the undersides of both reaches of the conveyor belt, as clearly shown in Figures 2, 4 and 5. The frictional contact between the friction belt 51 and the conveyor belt 30 will hold the conveyor belt against lateral movement.

While I have shown and described my invention as embodying certain details of construction it should be understood that this is primarily for the purpose of illustrating the principles of the invention and that many modifications and changes may be made in the details of construction without departing from the spirit or scope of the invention.

Having thus described our invention, what we claim is:

1. A feeding apparatus of the character described comprising a casing including a body part having an outlet opening and a removable cover having a charging opening in offset or non-alined relation to said outlet opening, a conveyor within said casing including a frame pivotally mounted at one end on said body part to be capable of bodily movement in said casing for cleaning and inspection, an endless conveyor belt mounted on said frame to receive pieces of material from said charging opening and convey them to said outlet opening, and means for driving said conveyor belt.

2. A feeding apparatus of the character described comprising a casing including a body part having an outlet opening and a removable cover having a charging opening in offset relation to said outlet opening, a conveyor within said casing including a frame having two sections one of which is pivotally mounted at one end upon said body part and has a slidable connection at its other end with the other section which is slidable upon said body part, a roller upon each of said sections, a conveyor belt passing around said rollers, spring means for normally influencing said sections apart to maintain said belt taut, and means for driving said rollers.

3. A feeding apparatus of the character described comprising a casing including a body part having an outlet opening and a removable cover having a charging opening in offset relation to said outlet opening, a shaft journaled on said body part adjacent one of said openings, a conveyor frame journaled at one end on said shaft to swing into and out of said body part, said frame having a second shaft at its other end adjacent the other opening to separably rest upon said body part, a roller upon each of said shafts, an endless belt passing around said roller, and means for driving the roller on the first-mentioned shaft.

JOHN W. KAUTZMAN.
JOHN H. PARKER.